United States Patent
Maeda et al.

(10) Patent No.: US 6,249,956 B1
(45) Date of Patent: Jun. 26, 2001

(54) METHOD AND APPARATUS FOR MANUFACTURING AC-GENERATOR'S STATOR FOR VEHICLE

(75) Inventors: Kazutaka Maeda, Toyota; Makoto Takahashi; Masaru Sugiyama, both of Okazaki; Youichi Kamakura, Anjo; Nobuo Suko, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/333,001

(22) Filed: Jun. 15, 1999

Related U.S. Application Data

(63) Continuation of application No. PCT/JP98/04659, filed on Oct. 14, 1998.

(30) Foreign Application Priority Data

Oct. 16, 1997 (JP) .................................................... 9-284082

(51) Int. Cl.[7] .......................... H02K 15/00; H02K 15/14; H02K 15/16
(52) U.S. Cl. .............................. 29/596; 29/564.1; 29/596; 29/605; 29/606; 140/72; 140/102.5; 140/106; 72/458; 72/479
(58) Field of Search ................................. 29/564.1, 596, 29/605, 606; 140/72, 102.5, 106; 72/458, 479

(56) References Cited

U.S. PATENT DOCUMENTS

| | | |
|---|---|---|
| 1,742,190 | * 1/1930 | Apple . |
| 2,387,885 | * 10/1945 | Davis . |
| 2,400,902 | * 5/1946 | Allen . |
| 4,437,230 | * 3/1984 | Greutmann ............................ 29/597 |
| 4,449,289 | * 5/1984 | Kindig .................................. 29/596 |
| 5,363,546 | 11/1994 | Bradtmueller et al. . |
| 5,522,125 | 6/1996 | Bradtmueller et al. . |
| 5,628,500 | 5/1997 | Iguchi ................................... 269/37 |
| 5,998,903 | * 12/1999 | Umeda ................................ 310/179 |

FOREIGN PATENT DOCUMENTS

| | | |
|---|---|---|
| 4301234A1 | 8/1993 | (DE) . |
| 0 162 317 | 11/1985 | (EP) . |
| 644761 | 10/1950 | (GB) . |
| 2 074 055 | 10/1981 | (GB) . |
| 2263653 | 8/1993 | (GB) . |
| 6-22511 | 1/1994 | (JP) . |
| 92/06527 | 4/1992 | (WO) . |

\* cited by examiner

Primary Examiner—Lee Young
Assistant Examiner—Paul Kim
(74) Attorney, Agent, or Firm—Pillsbury Winthrop LLP

(57) ABSTRACT

The object of the present invention is to provide a method and an apparatus for manufacturing a stator to improve accuracy in inserting conductor segments (3, 31, 32) into slots (2). The apparatus according to the present invention comprises a conductor holder (21, 22) holding the conductor segments (3, 31, 32) and an axial-moving-mechanisms (214) moving the conductor holder (21, 22) relative to a stator core (1) in an axial direction. The conductor holder (21, 22) holds straight portions (31b, 31c, 32b, 32c) of the conductor segments (3, 31, 32) to be inserted into the slots (2) from one end of the stator core (1).

7 Claims, 12 Drawing Sheets

METHOD AND APPARATUS FOR MANUFACTURING AC-GENERATOR'S STATOR FOR VEHICLE

This is a Continuation of: International Appln. No. PCT/JP98/04659 filed Oct. 14, 1998.

1. FIELD OF THE INVENTION

The present invention relates to a method and an apparatus for manufacturing an AC generator's stator for a vehicle such as a passenger car or a truck.

2. PRIOR ART

Since the AC generator for a vehicle has been required to be more powerful, the resistance of the stator winding is required to be lower and lower, thereby reducing the length of the magnet wire.

It is well known that a plurality of U-shaped conductor segments are respectively inserted into slots of a stator core in the same direction and are connected with each other to form a stator winding, thereby increasing the output power of a vehicular AC generator, as disclosed in International Publication Number WO 92/06527 (1992). Because U-shaped conductor-segments can be disposed very regularly in this structure, the slot-space factor and the output power thereof can be increased.

Before turn portions of conductor segments are twisted in a manufacturing process of the above conventional structure, an annular holder 310 holds the turn portions 301a, 302a, 303a of the conductor segments 301, 302, 303 as shown in FIG. 16 of the present application. Straight portions 301b, 302b, 303b are inserted into twisting tools 311, 312, which are twisted relative to the annular holder 310 in directions opposite from each other by an angle of T/2 (T is a pole-pitch angle). As a result, the straight portions 301b, 302b, 303b of the segments 301, 302, 303 are twisted at T/2 as shown in FIG. 17.

Because the annular holder 310 holds entire arc portions of the turn portions 301a, 302a, 303a of the segments 301, 302, 303, the coil ends becomes longer than coil ends formed without using the annular holder 310. That is, the wire length becomes longer.

In this conventional method, when the segments 301, 302, 303 are inserted into the slots, the segments 301, 302, 303 are held by the annular holder 310 at the turn portions 301a, 302a, 303a. The straight portions 301b, 302b, 303b are inserted into the slots with only the turn portions 301a, 302a, 303a being held.

In this method, the segments 301, 302, 303 are held only at the turn-portions 301a, 302a, 303a disposed on the end of the stator core opposite the end from which the segments are inserted into the slots. Therefore, the straight portions 301b, 302b, 303b can not be positioned accurately, and the segments 301, 302 303 may collide with the slot-inner-walls to be damaged when the conductor segments are inserted into the slots. If the number of slots increases, the distance between the slots decreases, and higher accuracy is necessary to the method. However, it is difficult for this method not provide such high accuracy.

3. DETAILED DESCRIPTION OF THE INVENTION

The present invention is made to solve the above problems and to provide a method and an apparatus for manufacturing a stator that improves the accuracy in inserting the segments into the slots.

The present invention is to provide a method and an apparatus for manufacturing a stator that reduces damages to the segments, and which form the short coil ends.

The present invention is also to provide a method and an apparatus for manufacturing a stator that has short coil ends.

To achieve the above objects, there is a feature characterized by including a conductor holder (21, 22) holding conductor segments (3, 31, 32) and an axial-moving mechanism (214) which moves the conductor holder (21, 22) in the axial direction relative to a stator core (1). The conductor holder includes a guide guiding straight portions (31b, 31c, 32b, 32c) of the conductor segments (3, 31, 32) inserted into the slots (2) in an axial direction.

Because the guide guides the straight portions of the conductor segments (3, 31, 32) inserted into the slots (2), the positioning-accuracy can be improved compared with a method in which only one end of the turn-portion is held. As a result, the conductor segments (3, 31, 32) are prevented from being damaged by their collision with the slot-inner-walls. The guide of the conductor holder (21, 22) is a member guiding straight portions (31b, 31c, 32b, 32c) of the conductor segments (3, 31, 32) into the prescribed positions. The guide can be integrated into a conductor holder which holds and moves the straight portions (31b, 31c, 32b, 32c) of the conductor segments (3, 31, 32), or into a guide member which guides the conductor segments (3, 31, 32) in a inserting step.

It is preferable, to improve positioning-accuracy, that the conductor holder (21, 22) guides the straight portions (31b, 31c, 32b, 32c) at portions adjacent to an end of the stator core (1).

The conductor holder (21, 22) includes a circumferential guide (211d, 211e) which guides opposite sides of the straight portions (31b, 31c, 32b, 32c) in the circumferential direction of the stator core (1).

Because the circumferential guide restricts the circumferential movement of the conductor segments (3, 31, 32), the conductor segments (3, 31, 32) are prevented from colliding with inner-walls of the slots (2).

The conductor holder (21, 22) comprises a radial guide (211c, 221) which guides opposite sides of the straight portions (31b, 31c, 32b, 32c) in the radial direction of the stator core (1).

Because the guide restricts radial movement of the conductor segments (3, 31, 32), the conductor segments (3, 31, 32) can be prevented from colliding with the radially inner-walls of the slots (2).

The circumferential guide (211d, 211e) and radial guides (211c, 221) move in the radial direction of the stator core (1).

The conductor holder (21, 22) holds the plural conductor segments (3, 31, 32) at the same time.

The circumferential-directional guide portions (211d, 211e) and the radial-directional guide portions (211a, 221c) can be moved in the radial direction.

Because a plurality of conductor segments (3, 31, 32) are held and inserted simultaneously, manufacturing efficiency can be improved.

A presser (16) can be added to press-fits the conductor segments (3, 31, 32) into the stator core (1) in the axial direction of the stator core (1).

Therefore, the conductor segments (3, 31, 32) can be inserted into the slots and position the same as desired.

The conductor segments (3, 31, 32) are preferably U-shaped, and the presser (16) comprises a circumferential supporting portions (16a) restricting turn portions (31a, 32a) of the conductor segments (3, 31, 32) to move in the circumferential direction of the stator core (1).

In this structure, because the circumferential supporting portions (16a) sandwiches the turn portions (31a, 32a) at the middle between opposite circumferential sides, the circumferential movement of conductor segments (3, 31, 32) can be restricted. The circumferential supporting portions (16a) prevents the circumferential movement of the conductor segments (3, 31, 32) so that the conductor segments (3, 31,32) can be prevented from colliding with the circumferential inner-walls of the slots (2) when the same are inserted into the slots (2).

The circumferential holder (16a) has a projection disposed on a surface of the presser (16) in contact with the turn portions (31a, 32a) of the conductor segments (3, 31, 32).

An axial holder (24) is further included at an end of the stator core opposite the presser (16) to hold edge portions (31d, 31e, 32d, 32e) of the conductor segments (3, 31, 32) in an axial direction when the presser (16) presses down the conductor segments (3, 31, 32).

When the presser (16, 23) presses down the conductor segments (3, 31, 32), both the turn portions (31a, 31b) and the edge portions (31d, 31e, 32d, 32e) are restricted. Therefore, the conductor segments (3, 31, 32) can be inserted into the slots (2) evenly with both the inner and outer segments thereof. Therefore, the straight portions (31b, 31c, 32b, 32c) of the conductor segments (3, 31, 32) can be prevented from being damaged in the slots (2).

The apparatus for achieving the above object includes a first turning tool (11) which holds one straight portions (31b, 32b) of the U-shaped conductor-segments (3, 31, 32), a second turning tool (12) which holds the other straight portions (31c, 32c) of the U-shaped conductor-segments (3, 31, 32) and turns relative to the first turning-tool (11), and a circumferential holder (16a) which holds middle portion of the turn portions (31a, 32a) of the U-shaped conductor segments (3, 31, 32) and restrict circumferential movement of the turn portions (31a, 32a).

When the turn portions (31a, 32a) are twisted, the circumferential supporting portion (16a) holds only the radially middle portions of the turn portions (31a, 32a) only in the circumferential direction. When the straight portion (31b, 31c, 32b, 32c) of the U-shaped conductor segments (3, 31, 32) are widened in the circumferential direction, only the middle portions of the turn portions (31a, 32a) are fixed so that the both sides of the turn portions can be bent smoothly in the curved line.

The U-shaped conductor-segments (3, 31, 32) include overlapping conductor segments of different radiuses of curvature. The first turning tool (11) and the second turning tool (12) respectively hold straight portions (31b, 32b) extending from opposite sides of the turn portions (31a, 32a) of the overlapping conductor segments (3, 31, 32) having the different radiuses. The circumferential holder (16a) restricts circumferential movement of the overlapping turn-portions (31a, 32a).

Thus, the overlapping turn portions (31a, 32a) can be twisted simultaneously.

Holding holes (111, 112, 121, 122) are provided in the first turning-tool (11) and the second turning-tool (12) in the axial direction thereof to hold the straight portions (31b, 31c, 32b, 32c) of the conductor segments (3, 31, 32).

As many the holding holes (111, 112, 121, 122) as a number corresponding to the number of the slots (2) can be provided at equal intervals in the circumferential direction.

A method to achieve the above object includes a fixing step of inserting straight portions (31b, 31c, 32b, 32c) of U-shaped conductor-segments (3, 31, 32) into holding holes (111, 112, 121, 122) of a first turning-tool (11) and of a second turning-tool (12), a turn-portion-holding step of holding only a middle portion of the turn portions (31a, 32a) to restrict circumferential movement of the first and second turning-tools (11, 12), and a twisting step of twisting the first turning-tool (11) and the second turning-tool (12) relative to each other.

When the turn portions (31a, 32a) are twisted, the circumferential holder (16a) holds the turn portions (31a, 32a) only circumferentially and only at the radially middle portion of the turn portions (31a, 32a)

When the straight portions (31b, 31c, 32b, 32c) of the U-shaped conductor segments (3, 31, 32) are widened circumferentially, only the middle portion of the turn portions (31a, 32a) is fixed so that the opposite sides of the turn portions (31a, 32a) can form a smooth curve.

The plural conductor segments (3, 31, 32) can be aligned in the circumferential direction. Plural turn portions (31a, 32a) having different radius of curvature can be overlapped.

Thus, the turn portions (31a, 32a) of the plural conductor segments (3, 31, 32) can be twisted simultaneously.

The method of achieving the above object includes a holding step of holding U-shaped conductor segments (3, 31, 32), an inserting step of guiding and inserting straight portions (31b, 31c, 32b, 32c) from edge portions (31d, 31e, 32d, 32e) thereof into slots (2), and a press-fitting step of press-fitting the U-shaped-conductor segments (3, 31, 32) into the slots (2) at turn portions (31a, 32a) thereof.

Because the conductor segments are guided into the slots at portions adjacent to the slots, higher positioning-accuracy can be obtained as compared with turn portions supported only at the turn portions (31a, 32a). As a result, the conductor segments can be prevented from colliding with the inner-walls of slots, thereby preventing damages.

The inserting step restricts movement of the turn portions (31a, 32a) of the U-shaped conductor segments (3, 31, 32) in the circumferential directions of the stator core (1).

The press-fitting step includes a step of restricting movement of the turn portions (31a, 32a) at the middle thereof. Therefore, the conductor segments (3, 31, 32) can be prevented from shifting in the circumferential direction when the same are inserted in to the slots (2) so that the same can be prevented from colliding with the inner walls of the slots (2).

4. BRIEF DESCRIPTION OF THE DRAWING

5. PREFERRED EMBODIMENTS OF THE INVENTION

A preferred embodiment of the present invention are described in detail with reference to the appended drawings.

First Embodiment

Figure 1:
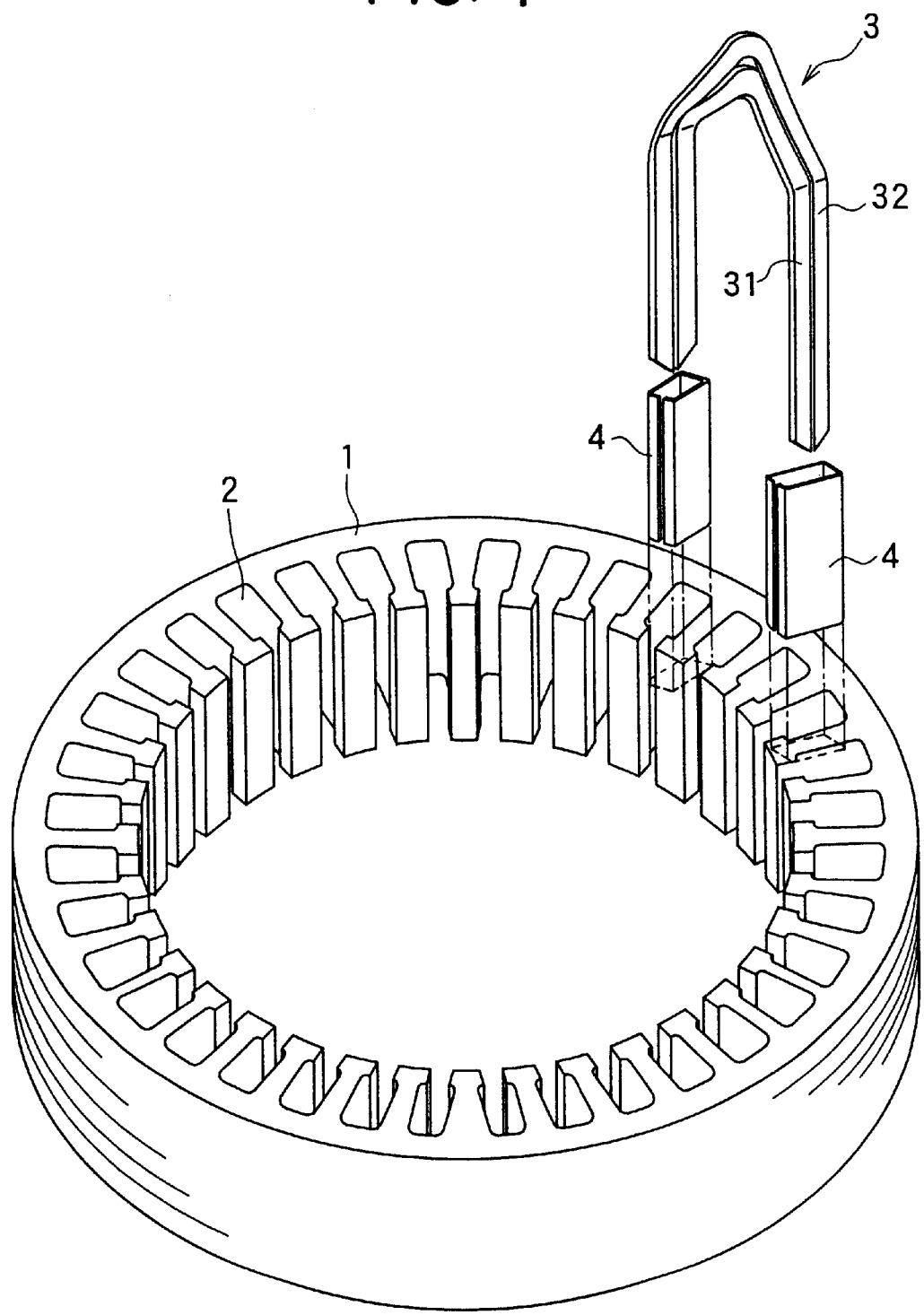
FIG. 1 is a perspective view of a stator core, insulators and segments of a stator according to a preferred embodiment of the invention.

A method and an apparatus for manufacturing an AC generator's stator for a vehicle according to a first embodiment of the present invention are described in detail with reference to FIGS. 1–14. FIG. 1 is perspective view of a stator core, insulators and segments used in manufacturing a stator.

A plurality of U-shaped conductor segments 3 (hereinafter referred to as "the segments") are respectively inserted into plural slots 2 formed on a cylindrical stator core in the circumferential direction, and edge portions of the segments are connected to form a stator winding.

Figure 2:
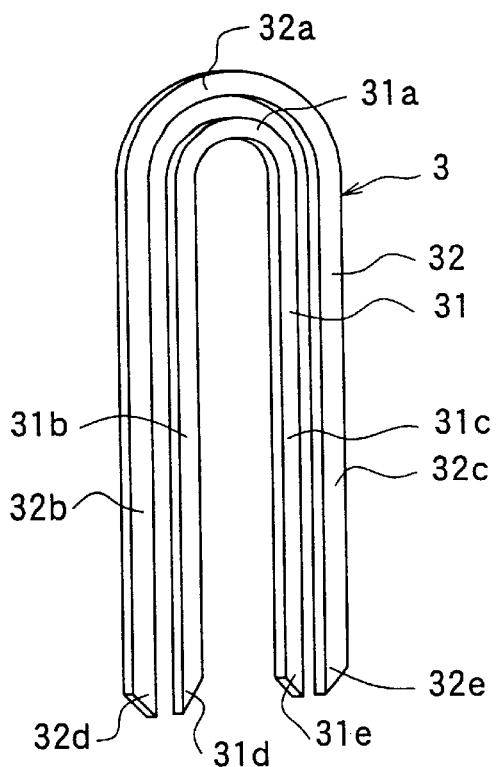
FIG. 2 is a perspective view of segments before twisting.

A copper wire having a rectangular-cross-section is cut into segment having a prescribed length, which is bent to form the U-shaped segments 3. As shown in FIG. 2, there are two kinds of U-shaped segments 3, a big segment and a small segment. The turn portion 32a of the big segment 32 surrounds the turn portion 31a of the small segment 31. Edge portions 32d, 32e of the big segment 32 have tapered surfaces descending from the outside to the inside thereof, and edge portions 31d, 31e of the small segment 31 have tapered surfaces descending from the inside to the outside thereof.

Figure 3:
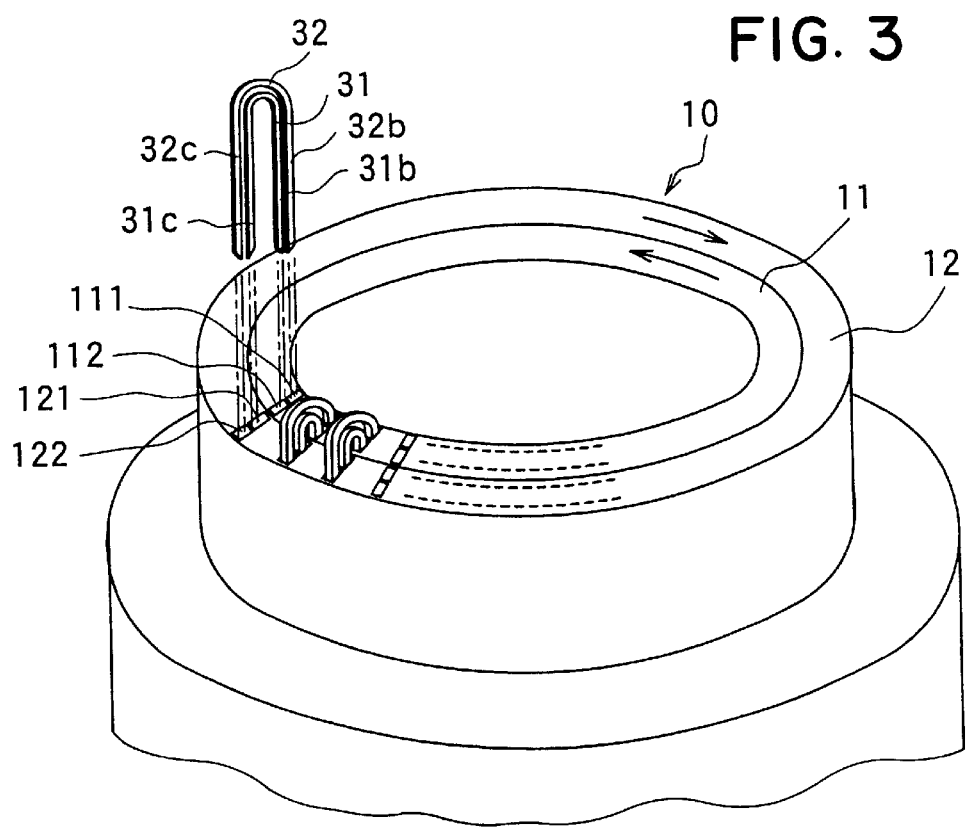
FIG. 3 is a perspective view of a twisting tool for turn-portions.
Figure 4:
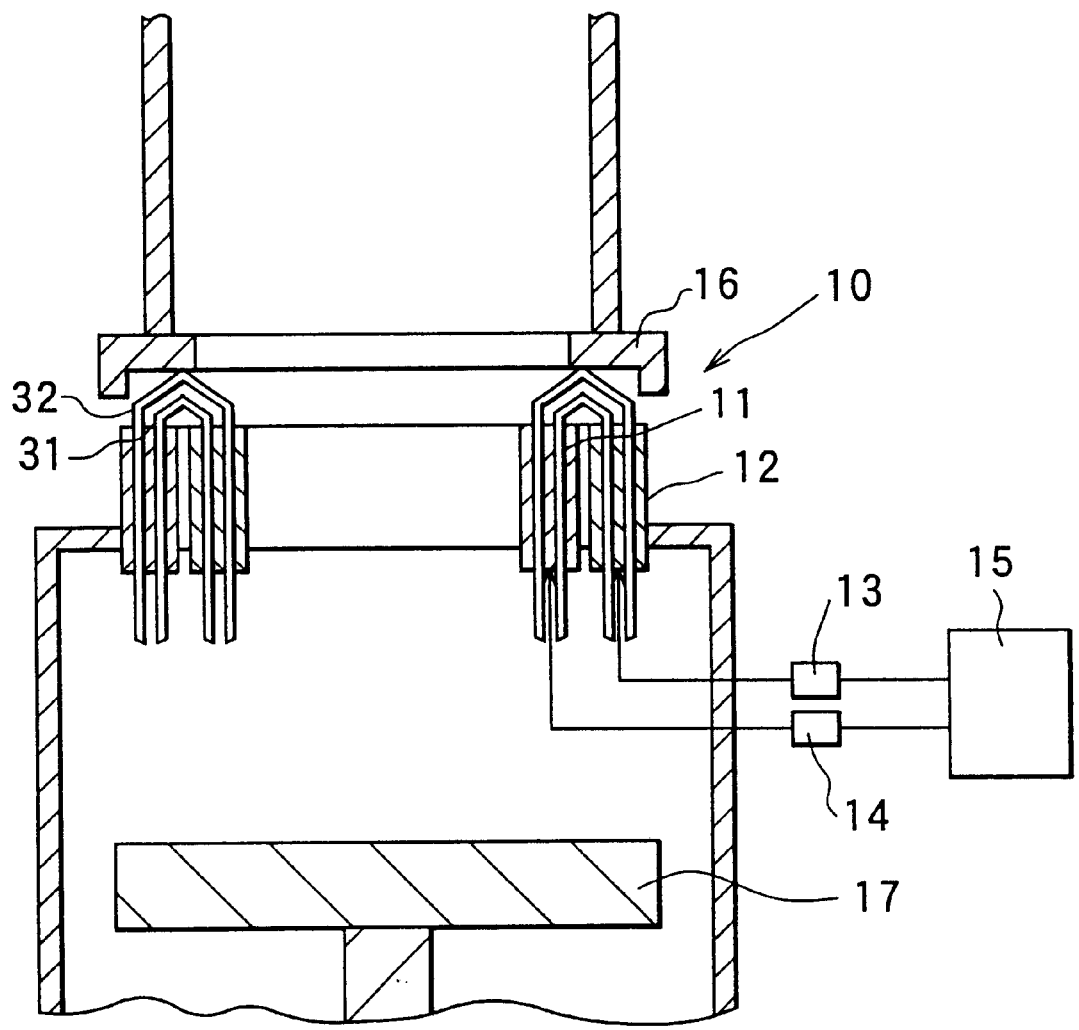
FIG. 4 is a cross-sectional view of the twisting tool for the turn-portions.

FIG. 3 is a perspective view of a twisting tool for the turn portions of the segments 3. FIG. 4 is a cross-sectional view of the twisting tool for the turn portions. The twisting tool 10 for the turn-portion includes an inside-twisting member 11, an outside-twisting member 12, turning mechanisms 13, 14 for turning the inside and outside twisting members 11, 12 respectively, a controller 15, a segment-presser 16, and a segment pusher 17.

Segment-holes 111, 112 for the straight portions 31b, 32b of the segments 3 inserted and held therein are formed side by side radially in the inside-twisting tool 11. As many (e.g. 36) segment-holes 111, 112 as the number corresponding to the number of the slots 2 are formed in the circumferential direction at qual intervals. In other words, 36 segment-holes 111, 112 are formed in a circle at equal intervals. The segment-holes 121, 122 of the outside-twisting tool 12 are the same as the holes 111, 112 of the inside twisting member 11. As a result, four segment-holes 111, 112, 121, 122 are formed in a radial line from the inside twisting members 11 to the outside twisting member 12.

A pair of small and big bent segments 3 shown in FIG. 3 are inserted simultaneously into the segment-holes 111, 112, 121, 122 of the inside and outside twisting members 11, 12.

After the segments 31, 32 are inserted into all the segment-holes 111, 112, 121, 122, the annular presser 16 is brought in contact with the turn portion 32a of the big segment 32 from the upper side of the inside and outside twisting members 11, 12. Because the turn portion 31a of small segment 31 is surrounded by the portion 32a of the big segment 32, the turn portion 31a of the small segment 31 is pressed-down by the turn portion 32a of the big 32. Thus, the small and big segments 3 are prevented from jutting out from the segment-holes 111, 112, 121, 122.

Figure 5:
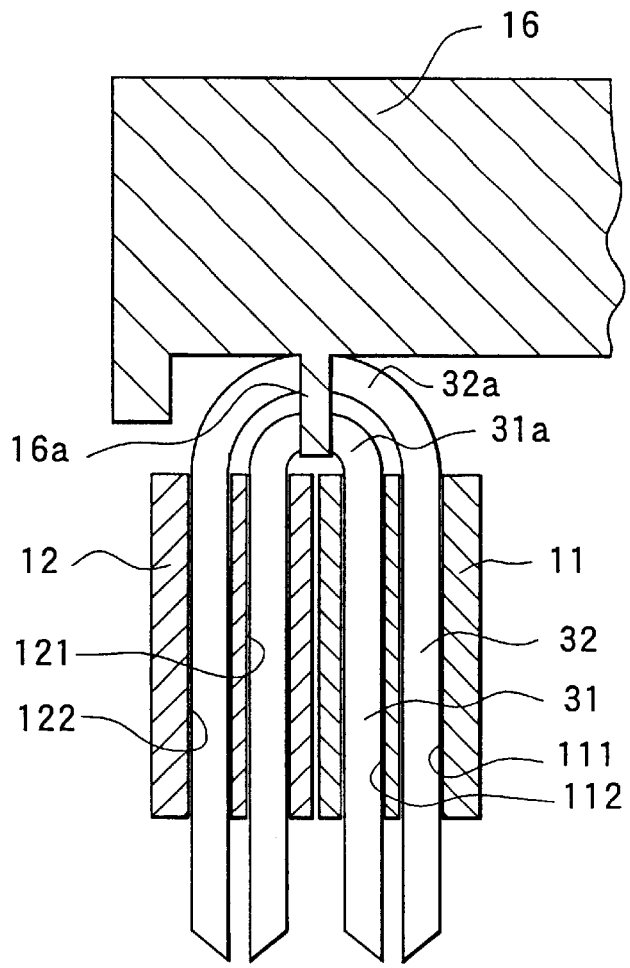
FIG. 5 is a fragmentary cross-sectional view of the segments and a segment pressor.

FIG. 5 is a fragmentary cross-sectional view of the segments inserted into the segment-holes and the segment presser. The segment presser 16 includes cylindrical projections 16a inserted in the axial direction between the adjacent turn portions 31a, 32a of the small and big segments 3. The projection 16a is disposed at the radially central portion of the turn portions 31a, 32a to hold the middle of the turn portions 31a, 32a between the circumferentially opposite sides thereof, thereby to restrict the circumferential movement of the middle portions.

The inside and outside twisting members 11 and 12 are turned by the twisting mechanisms 13, 14 which are respectively controlled by the controller 15. The inside twisting member 11 turns counter-clockwise as seen from a portion above the twisting tool 10 of the turn portion, and the outside twisting member 12 clockwise respectively by angle T/2 (i.e. one and a half slot-pitches). Thus, the turn portions 31a, 32a of the small and big segments 3 are twisted in the cicumferential-direction.

Figure 6:
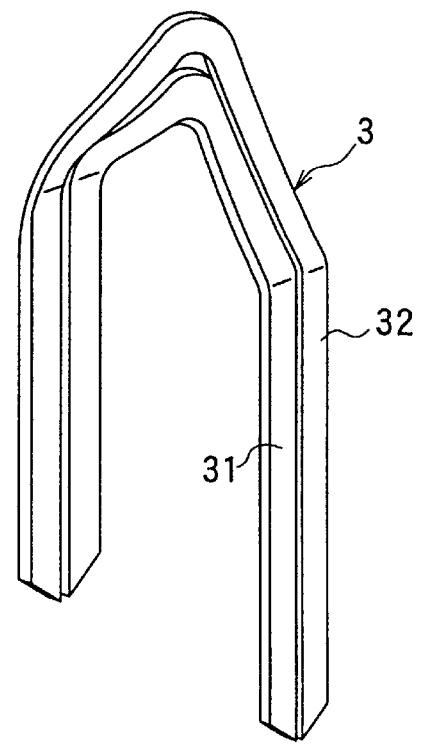
FIG. 6 is a perspective view of twisted segments.

When the turn portions 31a, 32a are twisted, the projection 16a does not hold the turn portions 31a, 32a except at the radially middle portion of the turn portions 31a, 32a in the circumferential direction. When the straight portions 31b, 31c, 32b, 32c of the small and big segments 3 are widened in the circumferential direction in the twisting step of the side of the turn portions 31a, 32a, only the middle of the turn portions 31a, 32a are fixed so that the both sides of the turn portions can bent smooth in a curved line. Thus, the small and big segments 3 having twisted turn portions 31a and 32a, as shown in FIG. 6, can be provided. It is important that both the twisting members 11 and 12 are twisted relative to each other. Therefore, one of the twisting members 11, 12 can be twisted if the other is fixed.

Steps of pulling the small and big segments 3 having the twisted turn portions 31a, 32a out of the twisting tool 10 and inserting the same into the slots 2 of the stator core are described below.

Figure 7:
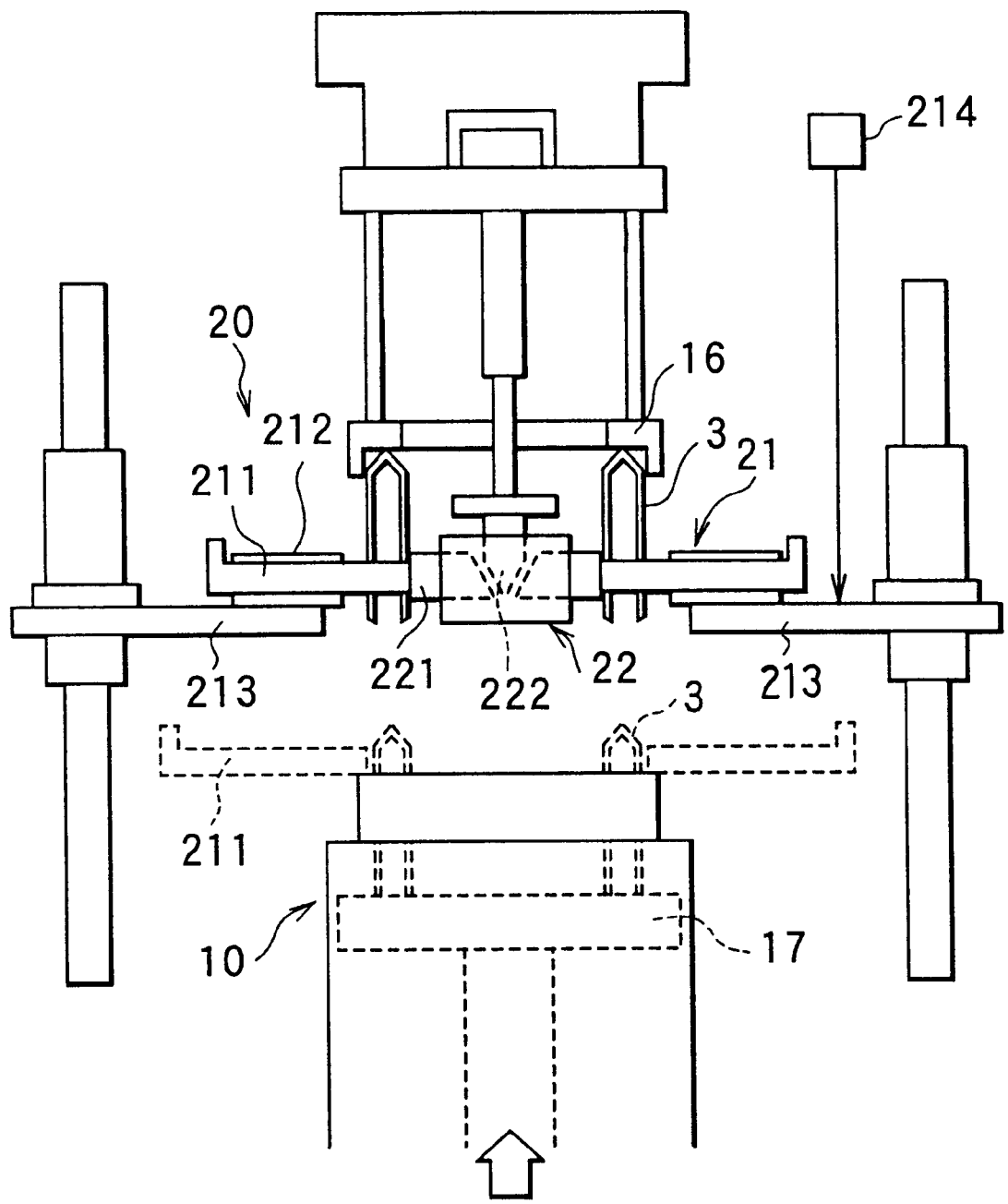
FIG. 7 is a schematic view illustrating a step of taking the segments out of the twisting tool.
Figure 8:
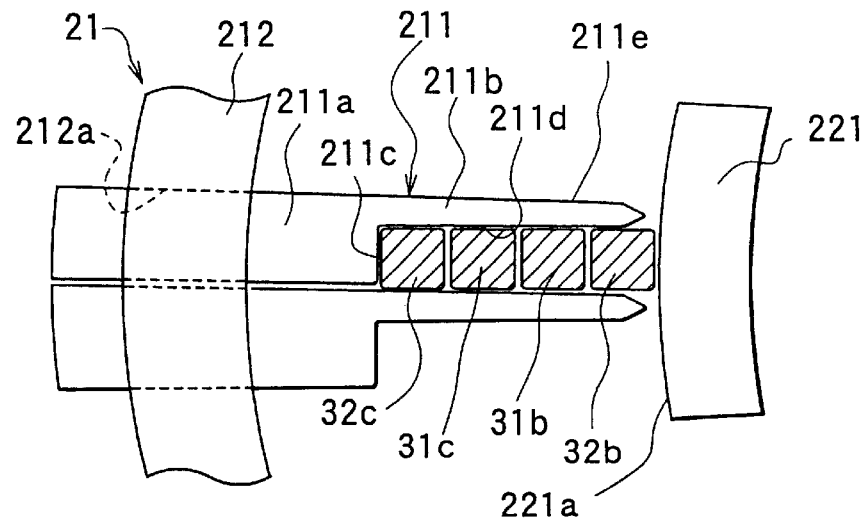
FIG. 8 is a schematic view illustrating the segments held by an outer side holder and an inner side holder.

FIG. 7 is a schematic view illustrating step of pulling the twisted segments out of the twisting tool, and FIG. 8 is a schematic view illustrating the segments held by an outside holder and an inside holder. The segment pusher 17 is disposed under the inside and outside twisting members 11 and 12. When the segment pusher 17 is raised, the edge portions 31d, 31e, 32d, 32e of the small and big segments 3 twisted by the twisting tool 10 are pushed up in the axial direction. Accordingly, the straight portions 31b, 31c, 32b, 32c of the segments 31, 32 are pulled out partially from the segment-holes 111, 112, 121, 122. The outside and inside holders 21 and 22 hold the pulled-out portions of the straight portions 31b, 31c, 32b, 32c.

The outside holder 21 has thin tooth members 211 and a teeth holder 212. The teeth holder 212 is a cylindrical member having 36 rectangular through holes 212a extending radially to correspond to the 36 slots of the stator core 1. Each of the tooth members 211 has a base portion 211a having a rectangular cross-section and a tooth 211b extending radially inward from a side of the base portion 211a. The cross-section of the base portion 211a corresponds to the shape of the hole 212a. The base portion 211a of the teeth member 211 is inserted into one of the holes 212a. The tooth members 211 can be moved in the radial direction by the driving-mechanism 215.

The inside holder 22 includes plural fan-shaped inside holder member 221 and an extruder 222 extruding the inside holders 221 in the radially outside direction. The radially inner end of the holder members 221 has a surface tapering from above to below. The extruder 222 has a cone-shaped lower portion with the point down.

The tooth members 211 are moved radially inward to insert the tooth portions 211b between the straight portions 31b, 31c, 32b, 32c adjacent to each other, which extend from the segment-holes 111, 112, 121, 122. The edge of the tooth portion 211b is tapered, thereby, to be inserted easily between the straight portions 31b, 31c, 32b, 32c.

The straight portions 31b, 31c, 32b, 32c are held between the inside surface 211d of one tooth portion 211b and the outside surface 211e of adjacent tooth portion 211b. Because the segments 3 are pushed by a length in the axial direction before being held by the tooth members 211, the straight portions 31b, 31c, 32b, 32c of the segments 3 can be held at portions lower by the same length than upper ends thereof.

The extruder 222 can be moved up and down by the driving-mechanism 223. The inside surface of the inside holder 221 is in contact with the cone surface of the extruder 222. Therefore, the holder members 221 are moved in radially outward by downward motion of the extruder 222, and outside surface 221a of the inside holder 221 is brought in contact with the innermost straight portion 32b of four segments 3 aligned in a radial direction, thereby pushing the straight portions 31b, 31c, 32b, 32c radially outward.

On the other hand, an outside holding surface 211c of the tooth portion 211b engages with the outermost straight portion 32c of the four segments 3 when the tooth members 211 move inward, thereby pushing the straight portions 31b, 31c, 32b, 32c radially inward. Therefore, the aligned four segments 3 are held by the outside surface 221a of the inside holder 221 and the outside holding surface 211c of the outside holder 21 in the radial direction.

The outside holder 21 and the inside holder 22 hold the straight portions 31b, 31c, 32b, 32c and move upward to pull the segments 3 out of the twisting tool 10. When the outside holder 21 and the inside holder 22 are moved upward, the inside holder 22 and a supporting-plate 213 of the outside holder 21 are moved by the driving-mechanisms 214, 224 to be synchronized with each other.

Figure 9:
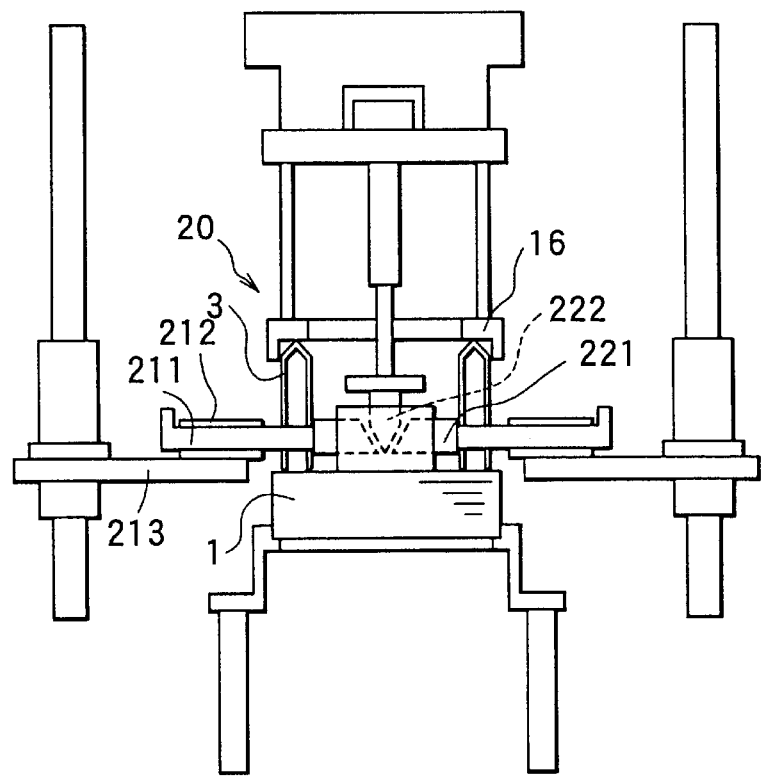
FIG. 9 is a schematic view illustrating a step of inserting edge portions of the segments into the slots.
Figure 10:
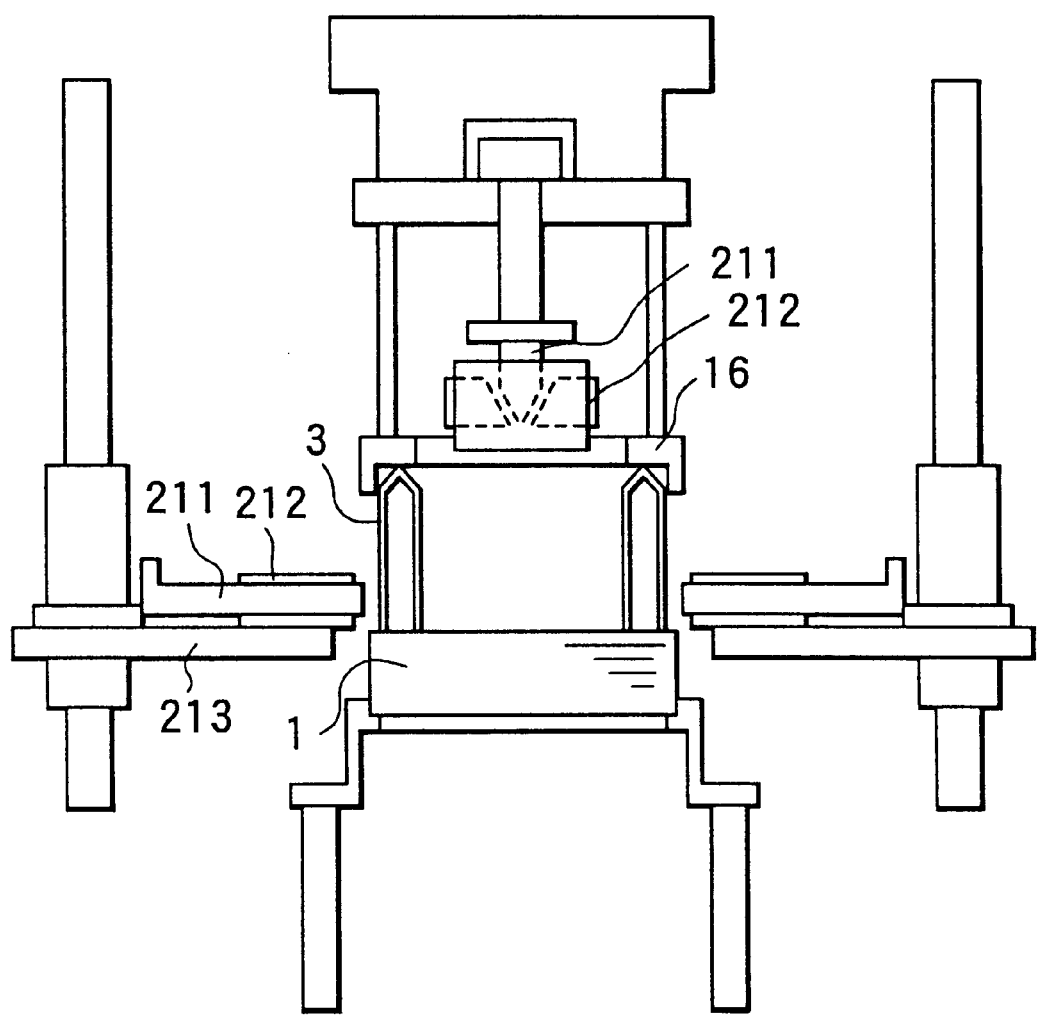
FIG. 10 is a schematic view illustrating a step of removing the conductor segments from an outside holder and an inside holder.
Figure 11:
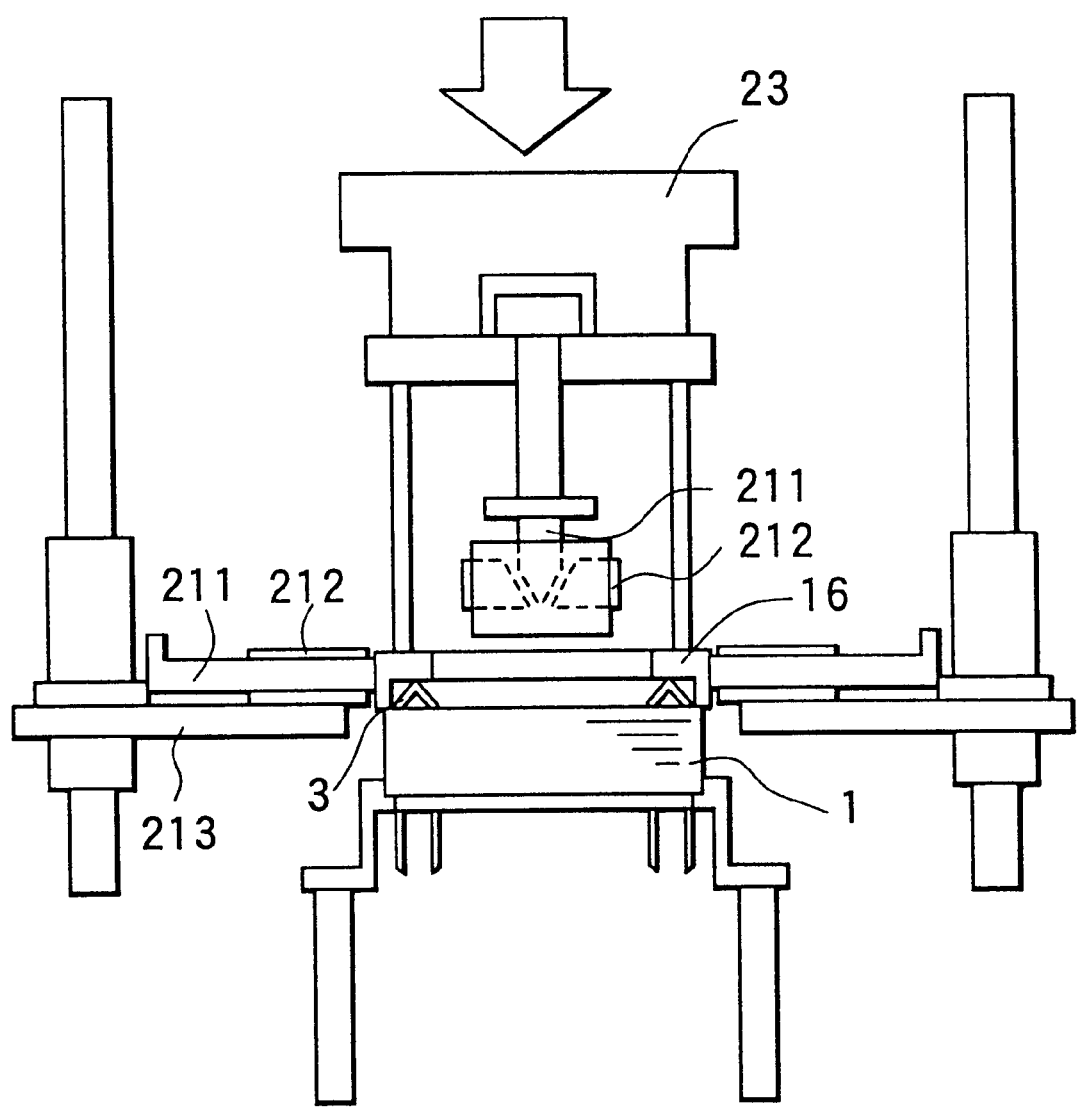
FIG. 11 is a schematic view illustrating a step of inserting the segments into the slots.

FIG. 9 is a schematic view illustrating a step of inserting the segments into the slots of the stator core 1 from the edge thereof; FIG. 10 is a schematic view illustrating a step of removing the outer-side holder and the inside holder from the segments; and FIG. 11 is a schematic view illustrating a step of press-fitting the segments into the slots.

As shown in FIG. 9, the stator core 1 is equipped with insulators 4 and is put in an assembling tool 20. The stator core 1 is positioned so that each of the slots is disposed to be opposite to corresponding one of the segments 3 held by the outside holder 21 and the inside holder 22. The outside holder 21 and the inside holder 22 are lowered from a portion above the stator core 1 to insert the segments 3 into the slots 2 from the edge portions 31d, 31e, 32d, 32e thereof.

In this step, the outside holder 21 and the inside holder 22 hold the straight portions 31b, 31c, 32b, 32c of the segments 3 at the lower portion along the length raised by the segment pusher 17. Because the straight portions 31b, 31c, 32b, 32c are held at the position near the edge portions 31d, 31e, 32d, 32e, high accuracy can be assured as compared to the apparatus supporting only the turn portions 31a, 32a. In other words, the holders 21, 22 are not only holders for holding plural segments to move, but also guides for guiding the edge portions of segments to the openings of the slots 2. In the foregoing description of the present invention, the outermost straight portion 32c and the innermost 32b of the four segments 3 disposed in a radial line have tapered surface. Therefore, the four segments 3 can be smoothly inserted into the slots 2.

When the straight portions 31b, 31c, 32b, 32c of the segments 3 are inserted into the slots 2, both the circumferential sides of the turn portions 31a, 32a are supported by the projections 16a of the segment pressor 16. Therefore, the segments 3 can be prevented from shifting in the circumferential direction, so that the positioning-accuracy can be improved.

As shown in FIG. 10, after the straight portions 31b, 31c, 32b, 32c of the segments 3 are inserted into the slots 2, the outside holders 21 are moved outward and the inside holders 22 are moved upward to free the segments 3. As shown in FIG. 11, a segment press unit 23 is lowered so that the segment presser 16 presses down the turn portions 31a, 32a of the segments 3. Thus, the segments 3 are press-fitted into the slots 2 to form coil ends of a prescribed height.

When the segments 3 are press-fitted into the slots 2, the turn portions 32a of the big segments 32 are pressed down by the segments presser 16. The projections 16a extending down from the bottom of the segment presser 16 hold the middle portions of the turn portions 31a, 32a to restrict the circumferential shift of the segments 3. Thus, the projections 16a prevent the segments 3 from colliding with the inner walls of the slots 2 to be damaged.

Figure 12:
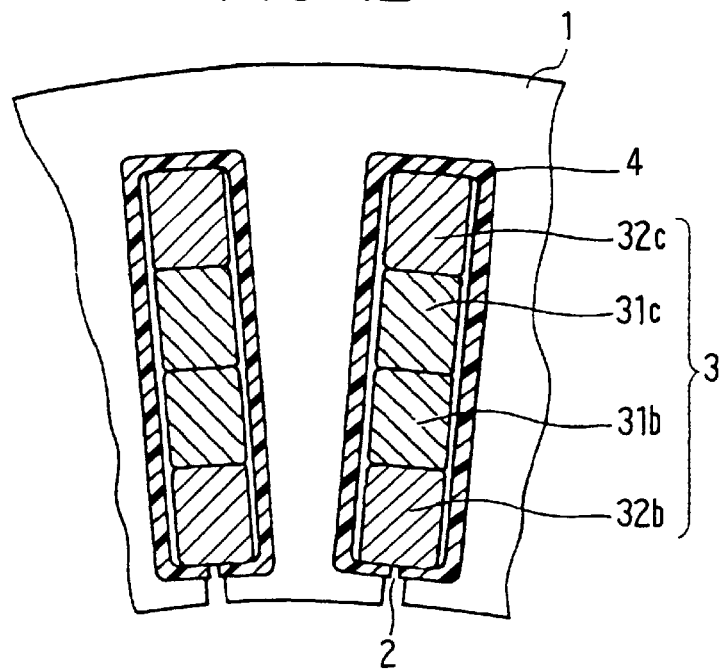
FIG. 12 is a fragmentary cross-sectional view of the stator.

The straight portions 31b, 31c, 32b, 32c of the four radially aligned segments 3 are inserted into the slot 2, so that four segments can be aligned in the slot, as shown in FIG. 12.

After the segments 3 are disposed in all the slots 2, the straight portions 31b, 31c, 32b, 32c of the segments 3 extending from the slots 2 are alternately twisted in opposite directions in each layer, respectively by angle of T/2 (i.e. one and a half slot-pitches) by an edge twisting tool (not shown). In other words, the segments 3 in the first and third layers from the innermost layer are twisted by T/2 in one circumferential direction, and the segments 3 of the second and fourth are twisted by T/2 in the other circumferential direction. The twisted direction is the same each the layer all around the stator core 1, and the segments in the same layer incline to the same direction.

Figure 13:
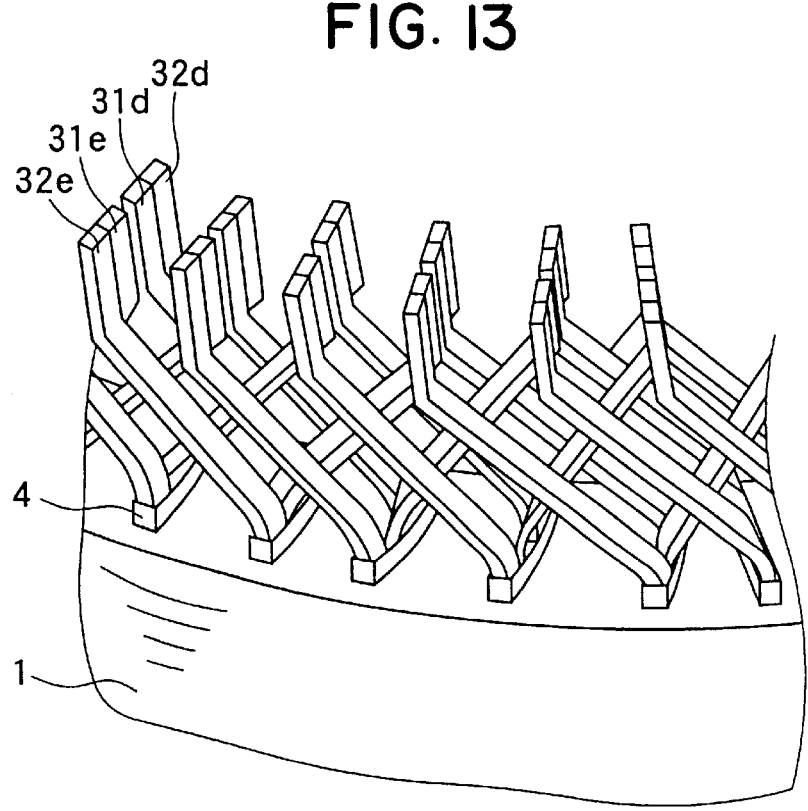
FIG. 13 is a fragmentary perspective view of the stator.

After the straight portions 31b, 31c, 32b, 32c of each the segments 3 are twisted in the circumferential direction, insulation films covering the edge portions 31d, 31e, 32d, 32e of the segments 3 are peeled off after the stator core with the twisted segments are taken off, with the edge portions 31d, 31e, 32d, 32e thereof being dipped in a strong alkaline solution. Thereafter, the edge portions 32d in the first layer from the innermost side and the edge portions 31d in the second layer are electrically connected, and the portions 31e in the third layer and the edge portions 32e in the fourth layer are connected by welding such as TIG welding, brazing, resistance welding, electron beam welding, laser beam welding. Thus, a three-phase stator winding is formed as shown in FIG. 13.

Figure 14:
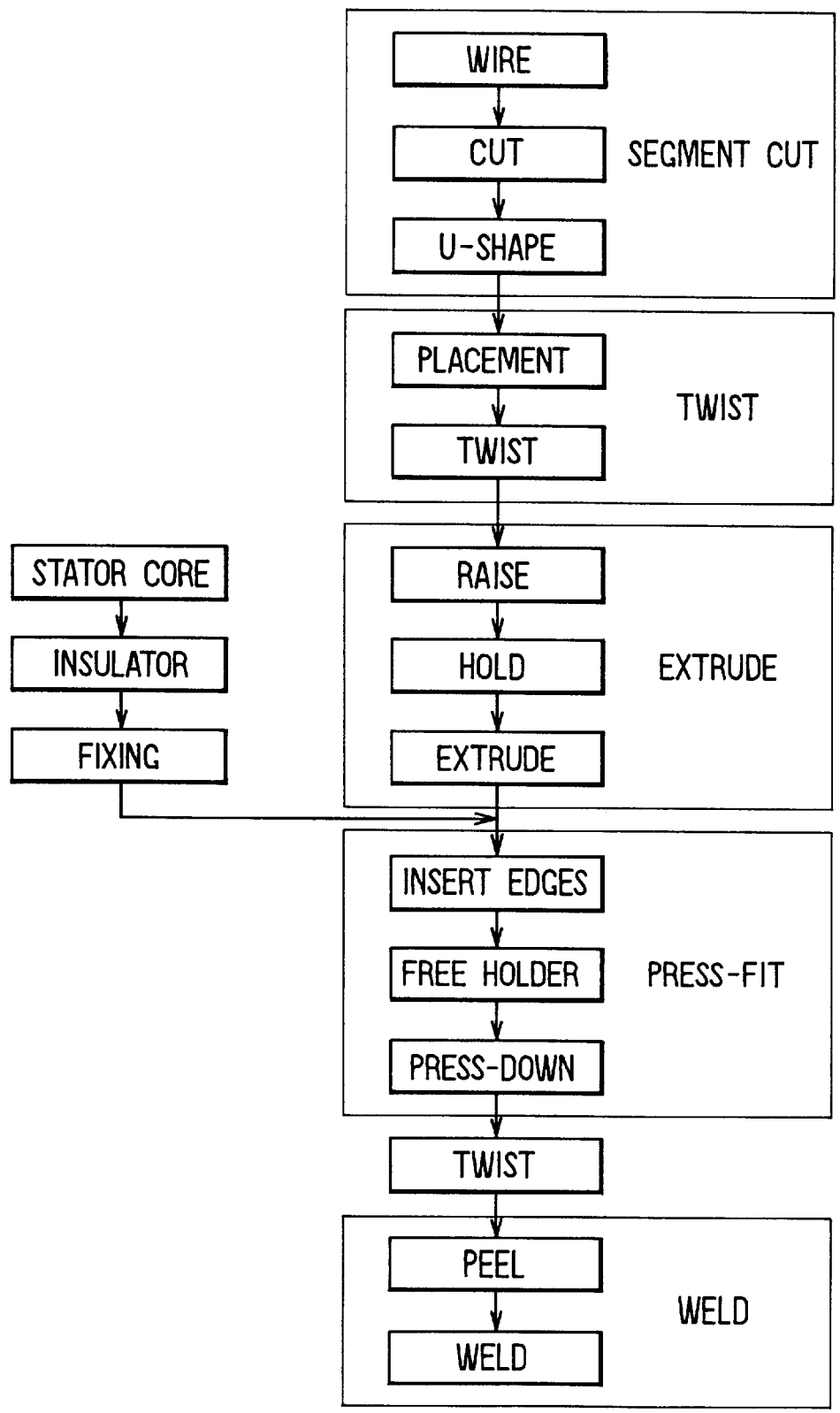
FIG. 14 is a flow diagram illustrating the steps of manufacturing the stator.

The method of manufacturing a stator using the apparatus described above is described with reference to a flow diagram shown in FIG. 14.

The method includes steps of manufacturing plural segments 31, 32, twisting the turn-portions 31a, 32a, pulling out the twisted segments 3, holding the stator core 4 with the insulators in the slots 2, inserting the segments into the slots 2 of the stator core 1, twisting the edge portions, and welding the edge portions 31d, 31e, 32d, 32e. The step of peeling the film can be included before the step of welding or in the step of manufacturing the segments.

When the turn portions 31a, 32a are twisted, the projection 16a holds the turn portions 31a, 32a partially to restrict the circumferential movement thereof. This prevents increase in the height and length of the coil ends of the turn portions 31a, 32a.

When the segments 3 are inserted into the slots 2, not the turn portions 31a, 32a but the straight portions 31b, 31c, 32b, 32c are held. That is, the segments 3 are held near the edge portions 31d, 31e, 32d, 32e of the segments 3 to be inserted into the slots 2. Therefore, the edge portions 31d, 31e, 32d, 32e can be positioned accurately as compared to those supported at the turn portion thereof. As a result, the segments 3 can be prevented from being damaged when the segments 3 are inserted into the slots 2 and, otherwise, collide with the inner walls of the slots 2. Even if the number of slots increases, the segments 3 can be positioned accurately.

The tooth members 211 of the outside holder 21 hold the segments 3 in the circumferential direction, thereby preventing the segments from colliding with the circumferential walls of the slots 2. The outside surface 221a of the inside holder 221 and the outside holding surface 211c of the outside holder 21 hold the segments 3 in the radial direction, thereby preventing the segments 3 from colliding with the radial walls of the slots 2.

The projections 16a hold the middle of the turn portions 31a, 32a between the circumferential sides thereof to restrict circumferential movement of the segments 3, when the segments 3 are press-fitted into the slots 2. The projection 16a restricts the segments 3 to shift circumferentially to prevent the collision of the segments 3 with the circumferential walls of the slots 2 when the segments 3 inserted into the slots 2.

A plurality of segments 3 are processed at the same time in the following steps: twisting turn-portions; pulling out the twisted segments 3; inserting the segments into the slots 2 of the stator core 1; twisting the edge portions; and peeling the insulation coating. As a result, the number of manufacturing steps and cost can be reduced.

Second Embodiment

Figure 15:
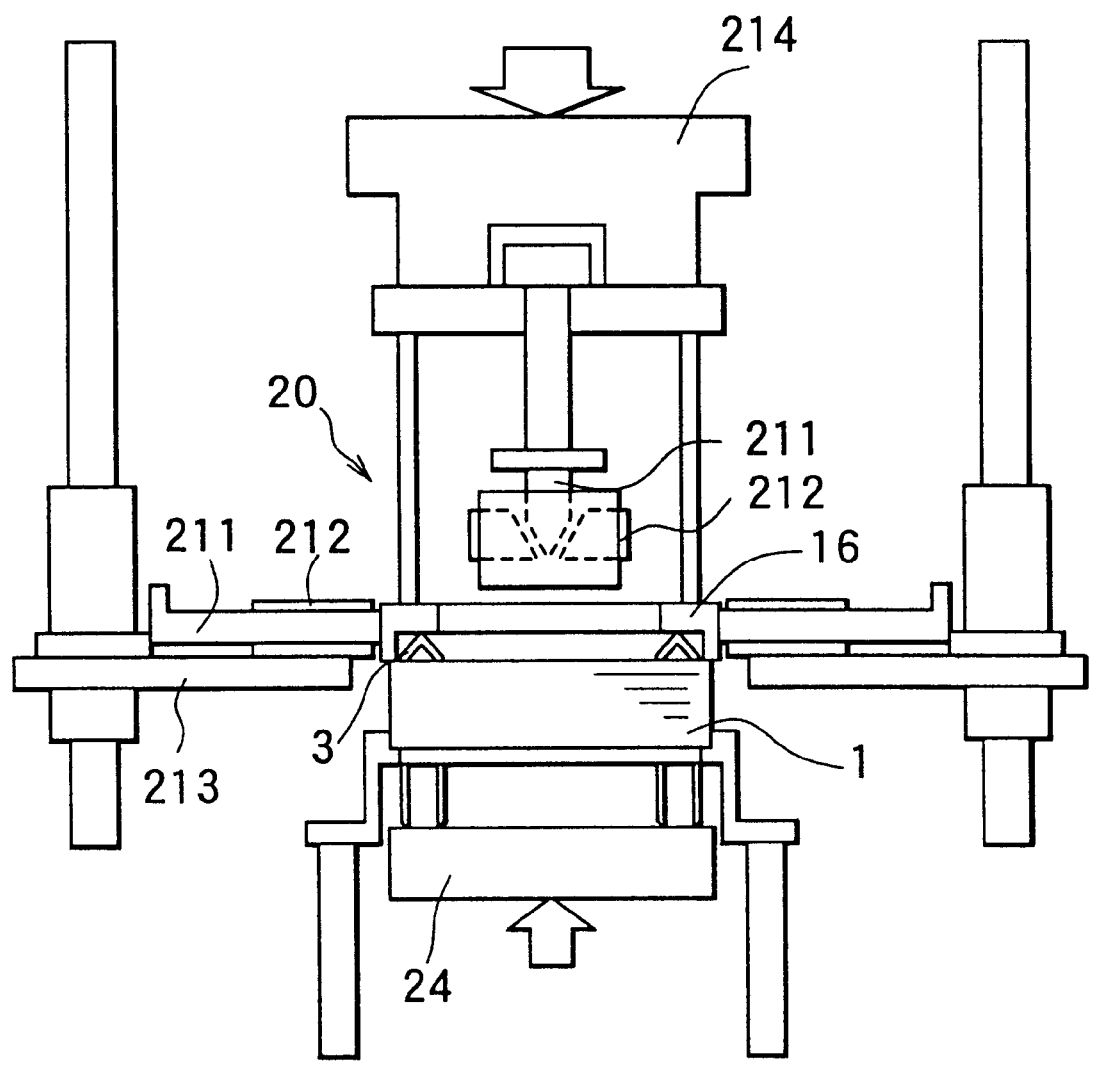
FIG. 15 is a schematic view illustrating a variation of the step of inserting the segments into the slots.
Figure 16:
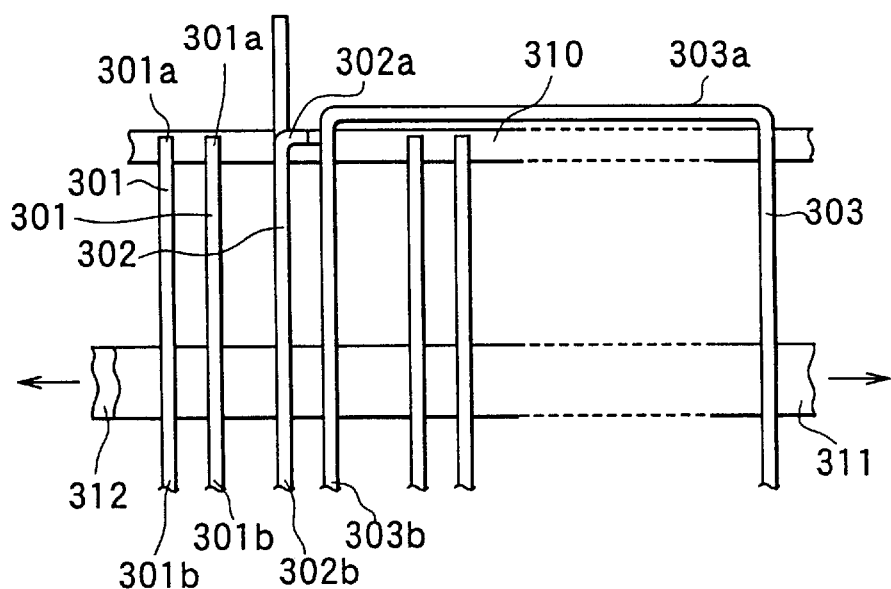
FIGS. 16 and 17 are schematic views respectively illustrating a conventional apparatus for twisting the turn-portions.
Figure 17:
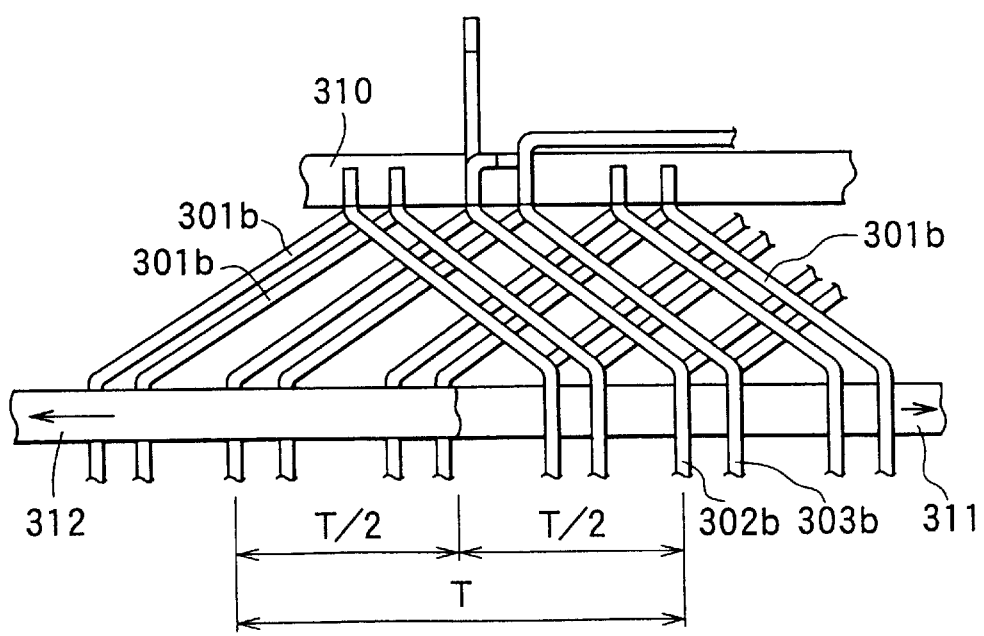

FIG. 15 illustrates a step of press-fitting the segments into the slots by use of a stator manufacturing apparatus according to a second embodiment. The method according to the second embodiment is almost the same as the first embodiment except a step of press-fitting the segments into the slots.

In the second embodiment, the assembling tool 20 has an axial-holder 24 of the segments. The axial-holder 24 is disposed on the side of the stator core opposite the side thereof from that the edge portions 31d, 31e, 32d, 32e of the segments 3 are inserted to hold the edge portions 31d, 31e, 32d, 32e of the segments 3.

In the step of press-fitting, the segments 3 are pressed by the presser while the segments are held at the edge portions 31d, 31e, 32d, 32e by the axial-holder 24.

The segments 3 are press-fitted into the slots 2 while the segments are supported at both the edge portions 31d, 31e, 32d, 32e and the turn portions 31a, 32a. The edge portions 31d, 31e, 32d, 32e are held to insert the segments 3 into the slots 2 smoothly in the radial direction. Therefore, the damages of the edge portions 31d, 31e, 32d, 32e caused in the slots 2 can be reduced.

Other Embodiment

The cross-section of the conductor can be formed circular. If each of the segments has a circular cross-section, the segment-holes 111, 112, 121, 122 of the twisting tool 10 of the turn-portions are made circular.

The holders for moving the plural segments 3 can be made separate from the guides for the edge portions 31d, 31e, 32d, 32e of the straight portions 31b, 31c, 32b, 32c of the plural segments 3 into the openings of the slots 2. For example, two holders are provided in the axial direction so that the upper holder can be used as a segment holder and the lower holder can be used as a segment guide instead of the unitary holder 21 according to the first embodiment.

The segments 3 can be disposed in a single cicumferential layer instead of multiple layers. In this arrangement, the holders 21, 22 described in above embodiments are efficient in moving the plural segments and insert them into the stator core 1 accurately.

Applicable Industrial Field of the Invention

The present invention relates to a method and an apparatus for manufacturing an AC generator for a vehicle such as a passenger car, a truck or the like. The method and apparatus according to the embodiment of the invention are useful to a powerful vehicular AC generator.

What is claimed is:

1. A method of twisting plural U-shaped conductor segments, each of which has a turn portion, a first-side straight portion and a second-side straight portion comprising:

inserting said first-side straight portions into holding holes of a first turning-tool and inserting said second side straight portions into holding holes of a second turning-tool, said first turning-tool and second tuning-tool being disposed to be concentric to relatively rotate in circumferential directions opposite to each other;

holding only a middle portion of each of said turn portions in circumferential directions to restrict circumferential movement of said turn portions, and twisting said turn portions by relative rotation of said first and second turning tools while said middle portion is held in said circumferential direction.

2. The method as claimed in claim 1, wherein each of said first turning tool and second turning tool comprises a ring member, and said holding holes are circumferentially aligned at said ring member.

3. The method as claimed in claim 1, wherein said inserting step comprises:

setting a smaller one of said-U-shaped conductor segments having a smaller turn portion and a bigger one of said U-shaped conductor segments having a bigger turn portion into a set;

inserting said first-side straight portions of said set of U-shaped conductor segments into said holding holes of said first turning-tool and inserting said second-side straight portions of said set of U-shaped conductor segments into said holding holes of said second turning-tool so that said turn portion of said bigger U-turn portion can surround said smaller U-turn portion.

4. The method as claimed in claim 1, wherein both sides of said middle potions in said circumferential direction are held.

5. The method as claimed in claim 1, further comprising:
pressing said turn portions by a segment presser to prevent said U-shaped conductor segments from jutting out from said holding holes of said first and second turning-tools.

6. The method as claimed in claim 5, wherein said middle portions are held by projections extending from said segment presser.

7. The method as claimed in claim 5, further comprising:
subsequent to said twisting, pushing said twisted conductor segments toward said segment presser by a segment pusher contacting tip portions of said first-side and second-side straight portions.

* * * * *